TELEPHONE PAY STATION

Filed June 13, 1956

3 Sheets-Sheet 1

INVENTORS W. D. GOODALE, JR.
W. PFERD
BY Kenneth B. Hamlin
ATTORNEY

TELEPHONE PAY STATION

Filed June 13, 1956 3 Sheets-Sheet 2

INVENTORS W. D. GOODALE, JR.
W. PFERD

BY Kenneth B. Hamlin

ATTORNEY

INVENTORS W. D. GOODALE, JR.
W. PFERD
BY Kenneth B. Hamlin
ATTORNEY

1

3,169,167

TELEPHONE PAY STATION

Walter D. Goodale, Jr., Summit, and William Pferd, Berkeley Heights, N.J., assignors to Bell Telephone Laboratories, Incorporated, New York, N.Y., a corporation of New York Filed June 13, 1956, Ser. No. 591,116
49 Claims. (Cl. 179—6.3)

This invention relates to telephone pay stations and more particularly to telephone pay stations employing coin collector circuits.

In present day dial telephone systems there are three types of calls which may be originated by the user of a telephone pay station, these are local or single unit calls, multi-unit calls, and toll calls. A local or single unit call requires the deposit of an initial or minimum rate and enables the customer, after deposit of the initial rate, to complete a call to any subscriber within the single unit area by dialing the party's directory number. Local or single unit calls do not require the assistance of an operator. Multi-unit calls are those calls requiring additional units of deposit and enable the customer, after such deposit, to complete a call to any subscriber within the area encompassed by the rate deposited by dialing the called party's directory number. With telephone pay stations now in general use, a multi-unit call requires operator monitoring of the deposit and upon verification of sufficient deposit, the call is completed. The third type of call, a toll call, requires operator assistance to establish the connection with the called party as well as to supervise the deposit, and covers all areas outside of those served by multi-unit calls. It will, therefore, be observed that with present day telephone pay stations all calls except single unit calls require the assistance of an operator to monitor the deposit.

Telephone pay stations generally known in the art today are equipped with coin collector circuits which implement the establishment of the above-described types of calls by performing several specific functions. Among these are the refund and collection of deposits, informing the central office of the amount of deposit, and preventing the use of the telephone services until the correct deposit has been made. Certain of these functions require the assistance of a telephone operator.

An object of the present invention is the provision of a telephone pay station requiring less assistance and monitoring by telephone operators in the establishment of calls.

In present day telephone systems, a central office is signaled when a telephone pay station desires service by the completion of a path to ground from one of the line conductors, either ring or tip, upon deposit of the initial coin or coins. This ground path completes a circuit through a line relay at the central office which in turn connects a dialing circuit to that particular pay station. This initial deposit control is accomplished in a manner well known in the art through the use of latches inserted into the coin chutes, so arranged that a particular minimum amount of deposit must be made before the coins will pass further down the chutes to activate a switch, known as the hopper trigger. The actuation of this hopper trigger completes a ground path. Such a system of latches is disclosed, for example, in Patent 2,179,091 issued to F. A. Hoyt et al. on November 7, 1939.

Another object of the present invention is the provision of a telephone pay station wherein the collection of initial deposits is more dependable.

A difficulty heretofore experienced with the above-described initial deposit control arrangement is that unscrupulous parties may fraudulently obtain telephone service from a telephone pay station by falsely grounding

2 the line conductors thereby signaling the central office that the initial deposit has been made. This difficulty has been alleviated in the prior art telephone systems by a fraud-prevention arrangement wherein the dial pulsing contacts of telephone pay stations are bridged or shorted until the correct deposit has been made. In this way, the dial is disabled until the initial deposit is made and even though one of the line conductors is fraudulently grounded and the central office connects a dialing circuit, the customer will be unable to make a call due to the inability to dial. In prior art telephone pay stations this fraud prevention arrangement is operationally linked to the above-described initial deposit control arrangement so that the short circuit path bridging the dial pulsing contacts is maintained until the initial deposit has been made, at which time the short circuit is removed and the dial is enabled.

An additional object of the present invention is the provision of a telephone pay station which is less susceptible to being defrauded.

Experience has shown that constantly changing economic conditions require adjustments in the rate schedules of telephone companies. These changing rate schedules often include changes in the amount of initial deposit for single unit calls from telephone pay stations and include changes in the amount of deposit necessary for multi-unit calls. The initial deposit control arrangement employing latches described above is a relatively static or inflexible arrangement. Heretofore, changes in rate schedules requiring an adjustment of the initial deposit control arrangement have necessitated a redesign and replacement of the latches utilized in this arrangement and, in some cases due to insufficient physical room or other design problems, an entirely new telephone pay station housing has been required. Furthermore, changes in rate schedules also necessitate the modification of the fraud-prevention arrangements in telephone pay stations presently in use.

Another object of the present invention is the provision of an improved telephone pay station wherein changes and adjustments required by revisions in rate schedules are facilitated.

As indicated hereinbefore, an operator must monitor all multi-unit and toll calls originated from telephone pay stations currently in use in order to verify that the correct amount of money has been deposited for these calls. This verification is accomplished through the use of gongs and chimes located in the telephone pay stations. These gongs and chimes are struck by the deposited coins, and the particular gong or chime struck depends upon the denomination of the coin. This system of central office apprisal of the deposit necessitates immediate transmittal of the audible deposit tones since there is no practical way of storing the tone of a gong or chime. Therefore, the operator must monitor the deposit of each coin, necessitating the supervision of each call beyond the local range from the time of initiation until sufficient deposit is made to pay for the service requested. With the current expansion of direct dialing facilities, more calls are coming within the multi-unit type of service and less are being made as toll calls. This results in a diminution of the operator's functions on many calls. On calls for which formerly an operator had to both complete the connection and verify the deposit, the operator must now only verify the deposit. It will be advantageous to have this verification operation performed as rapidly as possible, thus permitting the operator to serve more customers within any given time.

Still another object of the present invention is the provision of a telephone pay station facilitating more efficient and dependable deposit verification.

An additional object of the present invention is the provision of a telephone pay station wherein the total amount of money deposited for any call may be ascertained by the central office upon demand and with greater rapidity.

It is well known that the trend of the telephone industry is toward complete automation. The attainment of this objective necessitates a system of automatic deposit verification so that all calls from telephone pay stations may be handled as multi-unit calls and without any operator assistance whatever. The wide variation in tone frequency and tone strength transmitted by the present gong and chime arrangement does not lend itself to the use of automatic deposit verification equipment in the central office. For an automatic deposit verification system to be practical, an efficient and reliable source of deposit information capable of being automatically controlled and supervised by central office equipment must be incorporated in telephone pay stations.

A further object of the present invention is the provision of a telephone pay station wherein the total amount of money deposited for any call may be automatically verified from a remote location.

As mentioned above, the telephone industry is currently attempting to extend its facilities for multi-unit calls and at the same time provide more automatic handling of these calls. During a conversion of this nature, it is necessary that telephone service be conducted without interruption. To facilitate this conversion program telephone pay stations are needed which will operate under two conditions; one, the arrangement currently in use where operators verify deposits, and the other where deposits are automatically verified from the central office.

An additional object of the present invention is the provision of a telephone pay station facilitating automatic deposit verification and which is compatible with present day operator supervised deposit verification operations and procedures.

The present invention is, therefore, an improved telephone pay station wherein the aforementioned objects are attained.

A feature of the present invention relates to the provision in the coin collector of a telephone pay station of an adjustable initial deposit control means which may be rapidly and economically adjusted to comply with changing rate schedules.

Another feature of the present invention relates to the provision in the coin collector of a telephone pay station of an adjustable fraud-prevention means which may be rapidly and economically adjusted to comply with changing rate schedules.

An additional feature of the present invention relates to the provision of a coin collector in a telephone pay station having an independent initial deposit control means and an independent fraud-prevention means, each of which may be adjusted independently to comply with changing rate schedules.

Frequently the parties to a telephone conversation wish to exceed the time limit provided for by their initial deposit. When a call runs into overtime, the common procedure is to charge a smaller unit of money for each additional period of time. The average customer, upon hearing the coins drop into the collection box after his time limit is almost up, realizes that he must deposit more money to continue the conversation (or such an instruction may be posted in the telephone booth) and he may make such additional deposit without waiting for specific instructions to do so. Present day coin collectors in telephone pay stations provide a path to ground through the hopper trigger contact for overtime deposit check purposes. This provides a means of checking for overtime deposit on local calls without necessitating operator intervention. For example, assuming an initial rate requirement of ten cents, present coin collectors operate as follows. The first five-cent coin deposited is prevented from making a complete trip down its coin chute by a latch in the upper portion of the chute. Deposit of a second five-cent coin will trip this latch permitting both coins to proceed down the chute closing the hopper trigger contact and thereby grounding one of the line conductors. The call may then be completed by dialing. After elapse of the time permitted for the call, a coin relay in the coin collector is activated, collecting the deposit and resetting the hopper trigger. Therefore, the current path to ground no longer exists. A check by the central office will indicate this and the parties will be interrupted by an operator unless an additional coin is deposited. Since the latch is still open from the original deposit, if an additional five-cent coin is deposited it will pass down its chute reclosing the hopper trigger so that the central office, when checking, will note a ground and permit continued conversation. It is apparent that by reliance upon the latches the only overtime charge possible on local calls is one five-cent coin, and without major changes in such equipment, it cannot be adjusted to comply with new overtime charges.

A further feature of the present invention relates to the provision in the coin collector of a telephone pay station of an adjustable overtime deposit-checking means which may be rapidly and economically adjusted to comply with changing rate schedules.

Both during and following the use of a telephone pay station it is necessary to place the pay station deposit control equipment in a normal condition preparatory to reuse by a subscribed. This necessity may arise during a multi-unit call when in preparation for the recording of the necessary deposit, the initial amount is refunded; or, when following the elapse of the time allotted for a local call the original deposit is collected and an additional amount is required to continue the call into overtime. It is also imperative that the deposit control equipment be reset to a normal or ready-to-use condition upon completion of a call in order to provide an operative pay station for the next customer. The conditions requiring reset of deposit control equipment may be divided into two categories, reset during calls, and reset following termination of calls, either local or multi-unit.

Another feature of the present invention relates to the provision in the coin collector of a telephone pay station of means for resetting the deposit control means during either local or multi-unit calls and means for resetting the deposit control means upon termination of calls.

On multi-unit calls it is advantageous to read out the deposit information from a telephone pay station as rapidly as possible thereby permitting the central office read-out equipment or the operator to serve more calls. If the central office must wait for the deposit of each coin and read out the deposit information upon each such deposit, considerable time is consumed. By providing a totalizing and registering means in the coin collector of a telephone pay station, it is possible to perform the totalizing and registering of the amount of deposit at the pay station thus relieving the central office equipment or operator of this function.

A still further feature of the present invention relates to the provision in the coin collector of a telephone pay station of totalizing and registering means to totalize and register the amount of money deposited for any call.

In a telephone pay station the coin collector is the link between the telephone company and the prospective customer for collecting the correct revenue for the service requested. It is, therefore, imperative that it record and transmit all monetary deposits efficiently, accurately, and as already mentioned, in as short a time as possible. The operator or the automatic equipment at the central office can only be as accurate and rapid as the pay station coin collector deposit signaling means permit. By use of a coin totalizer, such as the type disclosed in the copending patent application of W. Pferd, Serial No. 518,070, filed June 27, 1955 (now United States Patent 2,929,479, granted March 22, 1960), it is possible to register and total all of the coins deposited without transmitting any information to the central office. In this way, upon demand of the central office, only the pertinent information, the total deposit, need be transmitted. This eliminates the waste of valuable time and equipment while waiting for a customer to fumble for change, which is a necessity when transient signaling means which transmit information upon deposit of each coin are used. The task of adding up such single deposits with the attendant possibilities of error is also eliminated.

An additional feature of the present invention relates to the provision in the coin collector of a telephone pay station of a coin totalizing means to control a deposit signaling means which permits the total deposit information to be transmitted to the central office upon demand.

Another feature of the present invention relates to the provision in a telephone pay station of a coin collector capable of transmitting to the central office upon demand, tone pulses, the number of which is representative of the total deposit.

Still another feature of the present invention relates to the provision in a telephone pay station of a coin collector capable of selectively transmitting to the central office upon demand, one of a plurality of frequencies characterizing the amount of total deposit.

A further feature of the present invention relates to the provision in a telephone pay station of a coin collector capable of applying, upon demand from the central office, a potential condition to the line a plurality of times, the number of which is representative of the total deposit.

A still further feature of this invention relates to the provision in the coin collector of a telephone pay station of means for resetting a coin totalizing means in discrete steps by signals from the central office, thereby permitting the central office to determine whether sufficient deposit has been made.

Until such time as toll calls are eliminated by the rapidly expanding multi-unit type of call, there will be areas where automatic multizone equipment will not be available and for this reason, it is necessary to provide a transient signaling system for informing the operator of the denomination of each coin of a plurality of coins deposited in telephone pay stations. In a system of this nature the signals representing each coin are transmitted immediately upon each deposit. The gongs and chimes used in present day telephone pay stations are an example of such a transient signaling means.

Another feature of this invention relates to the provision in a telephone pay station of more reliable and accurate transient signaling means for operator deposit apprisal.

A further feature of the present invention relates to the provision in the coin collector of a telephone pay station of an improved transient signaling means controlled by a coin identifying means for electronically producing a plurality of tone pulses, the number of which represents the denomination of each coin deposited.

A still further feature of the present invention relates to the provision in the coin collector of a telephone pay station of an improved transient signaling means controlled by a coin identifying means for electronically producing one of a plurality of signal frequencies representative of the denomination of the coin deposited.

The foregoing, as well as additional objects and features, will be more clearly understood and appreciated from the description below made in connection with the drawings, wherein.

Figure 8:
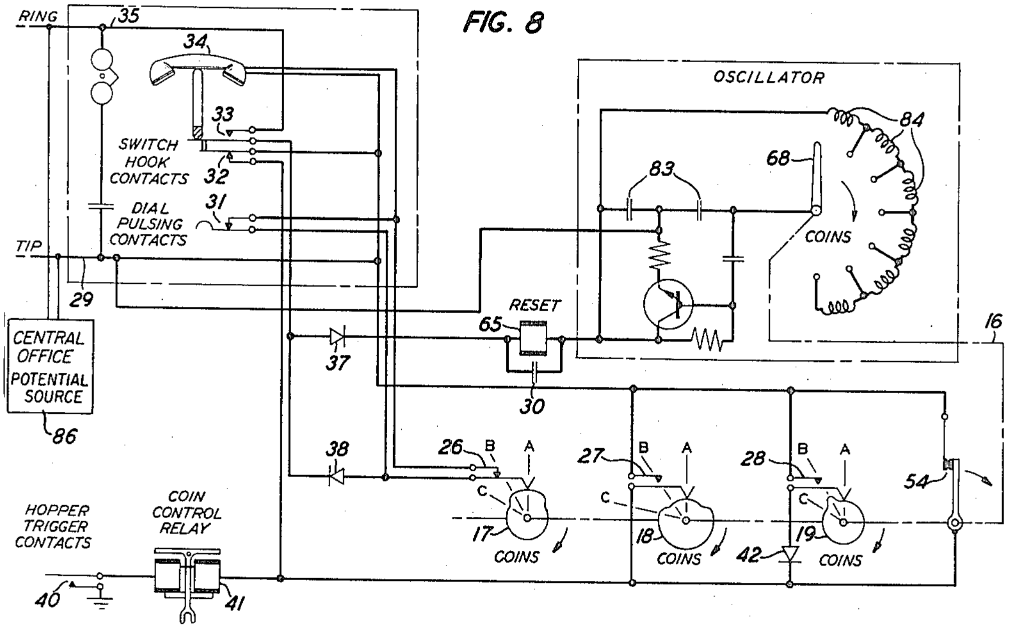
Figure 9:
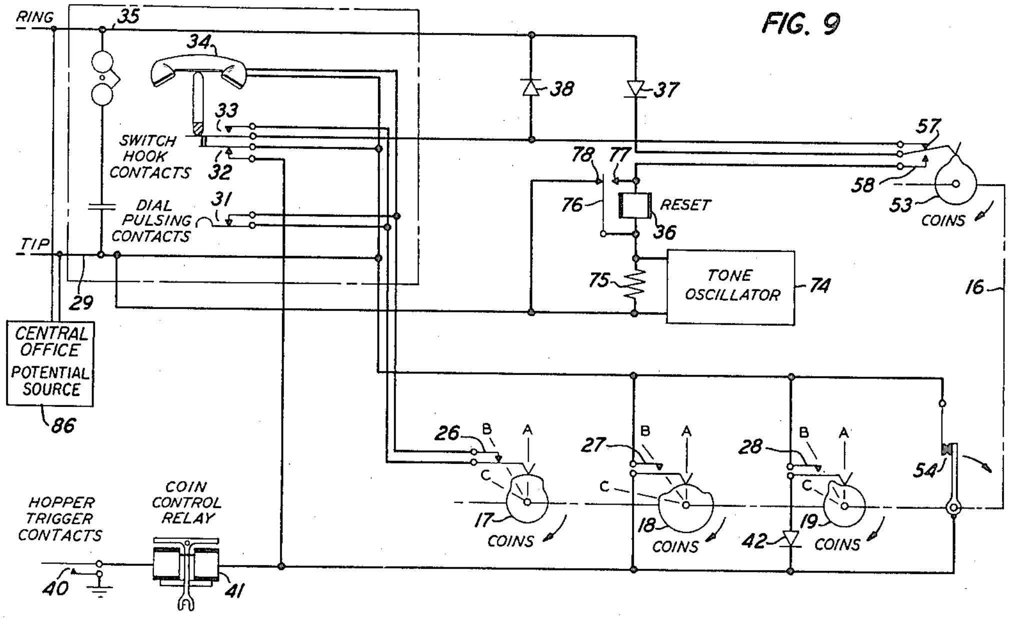

FIG. 8 shows a circuit schematic of a telephone pay station employing an illustrative embodiment of the invention wherein the central office is apprised of the amount deposited by transmitting a tone, the frequency of which is representative of the total deposit; and FIG. 9 shows a circuit schematic of a telephone pay station employing an illustrative embodiment of the invention wherein the central office is apprised of the amount deposited by transmitting a plurality of audible pulses, each representative of a five-cent increment of the total deposit.

Figures 1, 2, 3, 4, 5:
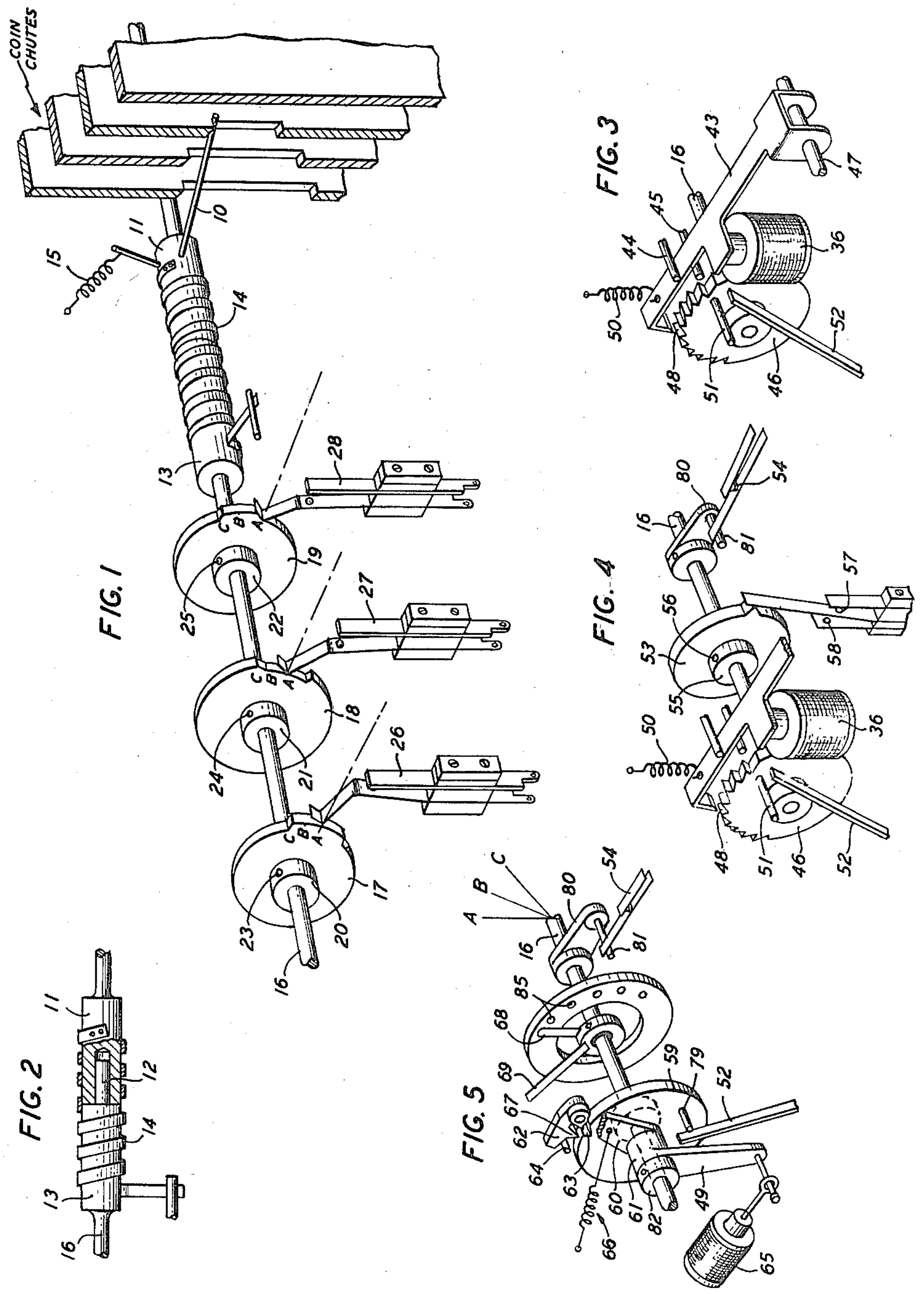
FIG. 1 is a perspective view of a coin totalizing mechanism and associated control devices used in this invention for fraud prevention, initial deposit control, and overtime deposit control.
FIG. 2 is a view of the coin totalizer band clutch mechanism which couples the coin finger control shaft and sleeve combination.
FIG. 3 is a perspective view of the totalizer reset device used in connection with the illustrative embodiment of the invention shown in FIG. 6.
FIG. 4 is a perspective view of the totalizer reset device and signal control cam used in connection with the illustrative embodiments of the invention shown in FIGS. 7 and 9.
FIG. 5 is a perspective view of the totalizer reset device and signal control switch used in connection with the illustrative embodiment of the invention shown in FIG. 8.

Referring to the drawings, four illustrative embodiments of the present invention are disclosed. The circuit schematics of these embodiments constitute FIGS. 6 through 9 respectively. Each of these embodiments employs a coin totalizing device to assist in performing the functions of local initial and overtime deposit control, fraud prevention, and multi-unit deposit registration and signaling. A basic requirement of the totalizing device is that it register in some fashion the value of each coin deposited and that it add up the values of the coins deposited presenting a sum which may be conveniently interpreted. The deposit interpreting means must be able to perform certain control functions and must be amenable to changes whereby the control functions are performed at different deposit values. One such coin totalizer is disclosed in the co-pending patent application of W. Pferd, Serial No. 518,070, filed June 27, 1955. This mechanism is illustrated in FIGS. 1 and 2 with several modifications to render it compatible with the present invention. The coin totalizer comprises, basically, coin finger 10 secured to and projecting from sleeve member 11 and is provided with a coaxial bore into which reduced section 12 of shaft or cylinder 13 fits. Actually, elements 11 and 13 constitute two cylinders which have a common axis of rotation and are torsionally coupled by the friction between the two and coil spring 14 fitted over the cylinder. Cylinder 11, to which coin finger 10 is secured in any suitable manner, is regarded as the driving cylinder, and cylinder 13 as the driven cylinder. It is well known that if driving cylinder 11 is rotated in such a direction as to wind up spring 14 and decrease its diameter, the spring will grip the cylinder and will exert more torque than it will when the direction of rotation is such as to tend to unwind the spring. Thus, when driving cylinder 11 is rotated in a clockwise direction, spring 14 is wound in a direction tending to decrease its diameter with the result that a substantial coupling torque is produced and driven cylinder 13 follows the clockwise rotation of cylinder 11. When driving cylinder 11 is rotated counterclockwise under the influence of spring 15, the coupling torque is substantially lessened and cylinder 13 does not tend to follow cylinder 11 under this condition. For a more complete description of the totalizing unit, reference may be made to the aforementioned patent application.

Adjustably mounted on shaft 16 and located to the left of cylinder 13 are three contact controlling cams 17, 18, 19. These cams are provided with shoulders 20, 21, 22 to accommodate set screws 23, 24, 25 which permit rotational adjustments of the cams relative to the shaft to be made. Spring pileups 26, 27, 28 are rigidly located with respect to the controlling cams so that the moveable springs thereof are acted upon by the surfaces of the controlling cams as the cams are rotated. Each of these cams performs a specific function in the illustrative embodiments to be discussed.

The deposit of a coin in the appropriate coin chute rotates coin finger 10 through an angle directly proportional to the denomination of the coin deposited in the manner described in the above-cited W. Pferd application. This imparts rotation to the shaft 16 which is also proportional to the denomination of the deposited coin. As more coins are deposited, shaft 16 rotates further in a clockwise direction and the amount of rotation at any given time is proportional to the total amount of deposit up to that time. It is apparent that the cams will, as deposits are made, act upon the spring contacts at certain degrees of rotation, or certain amounts of deposit, and that the amount of deposit at which the cams do act may be changed by loosening the set screws and adjusting the cams rotationally upon the shaft so that the arc through which they must rotate to impart such action is either enlarged or decreased. Such adjustments may be made to each cam independently or to all cams. The ability to make these adjustments provides the advantageous feature of flexibility in the control operations responsive to particular deposits.

In FIG. 1 three rotational positions, A, B, and C, are shown at which the coin totalizer and hence the control cams may reside after deposit of a particular amount. Position A indicates the original or no-deposit position; position B indicates the existing position when an amount sufficient to pay the local overtime charge is deposited; and position C indicates the existing position when an amount sufficient to pay the initial charge is deposited. As the coin totalizer and control cams are rotated, the contacting surfaces of the cams act upon their associated spring contacts causing them to either make or break at predetermined amounts of rotation, thereby performing control functions at specific amounts of deposit.

The three control cams shown in FIG. 1 are used in each of the illustrative embodiments to perform essential functions. Cam 17 is rotationally located upon the shaft 16 so that upon deposit of the initial charge, that amount necessary to make a local call, it permits spring contact 26 to open. As evident in each of the circuit schematics shown in FIGS. 6 through 9, the opening of this contact removes the short circuit across the dial pulsing contacts 31 and providing the central office has connected a dialing circuit, a customer may dial the desired directory number. Cam 18 is rotationally located upon the shaft 16 so that upon deposit of the initial charge, it will close contact 27. This contact closure is utilized in the illustrative embodiments to provide a path to ground from the tip conductor which may be used to inform the central office that a telephone pay station is requesting service. Cam 19 is rotationally located upon the shaft 16 so that upon deposit of the amount necessary to pay the overtime charge it will close contact 28. Reference to the illustrative embodiments shows that this contact closure establishes a circuit for unidirectional current between the tip conductor and ground. The existence of such a circuit provides the central office with a means of ascertaining when the charge for overtime conversation on local calls has been deposited.

FIGS. 3, 4, and 5 illustrate means of resetting the coin totalizer to a position indicative of zero deposit, and in addition several control devices are shown in FIGS. 4 and 5. The structure disclosed in each of these figures is to be located on the left end of the totalizer shaft shown in FIG. 1, and in combination with the structure of FIG. 1, provide an operative structure for use in one or more of the illustrative embodiments to be described below.

Figure 6:
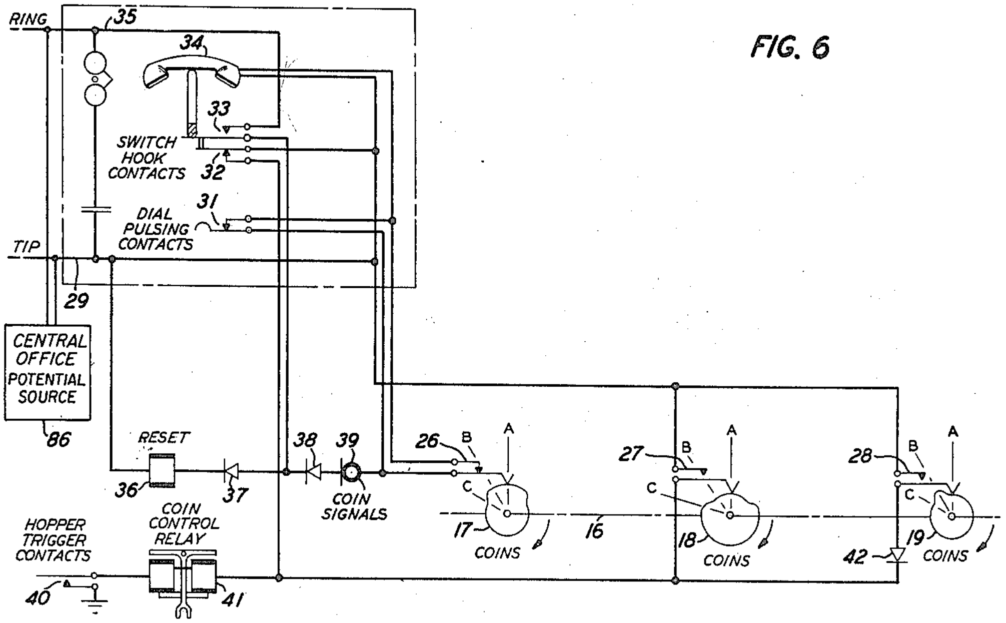
FIG. 6 shows a circuit schematic of a telephone pay station employing an illustrative embodiment of the invention wherein the central office is apprised of the amount deposited by having the coin totalizer stepped back in discrete amounts in response to signals from the central office.

The combination of the structures shown in FIGS. 1 and 3 provides the required control mechanism for the illustrative embodiment of the invention depicted in FIG. 6. The combination of the structure in FIG. 3 with that of FIG. 1 provides a totalizing mechanism which may be reset to the no-deposit position in either of two ways. One is used to assist in determining the amount deposited for multi-unit calls, and the other is used to reset the totalizer and prepare it for further operation after the deposit has been either refunded or collected. The components utilized for the former application consist of reset magnet 36 which may be energized by a D.C. voltage, armature 43 held against stop 44 by spring 50, lower stop 45 whose function will be described later, and toothed wheel 46. This toothed wheel is mounted upon the coin totalizer shaft 16 and, therefore, rotates clockwise as coins are deposited. When it is desired to reset the totalizer to a no-deposit position, reset magnet 36 is energized rotating armature 43 about pivot 47. The end of armature 43 engages the tooth 48 located immediately below the position in which it is normally poised, thrusting the entire wheel 46 in a counterclockwise direction. The downward motion of armature 43 is limited by stop 45 thereby controlling the degree of rotation imparted to wheel 46. Reset magnet 36 is then deenergized and armature 43 resumes its normal position under the action of spring 50. Reapplication of voltage will result in another counterclockwise step of wheel 46. Since toothed wheel 46 is secured to coin totalizer shaft 16, the coin totalizer will be reset in the same step fashion. The arc traversed by wheel 46 with each reset step is equal to that traversed by the coin totalizer upon deposit of one five-cent coin; therefore, the number of steps required to reset the totalizer is indicative of the number of five-cent increments in the total deposit. Referring still to FIG. 3, the second reset procedure makes use of member 51 which projects at right angles from the side of toothed wheel 46, and member 52, which is an extension of the armature of a coin control relay. Coin control relays having an armature and vane arrangement are well known in the art and are utilized to collect and refund deposited coins. The extension of the armature comprising member 52 is so oriented that the operation of the coin control relay to either the refund or collect position will cause member 52 to force member 51 to the left as shown in FIG. 3, thereby rotating wheel 46 and hence the totalizer in a counterclockwise direction thus resetting the totalizer. Member 52 is restricted in any suitable manner from moving any further than the axis of the shaft 16 thus preventing the possibility of setting the totalizer beyond the no-deposit position.

Figure 7:
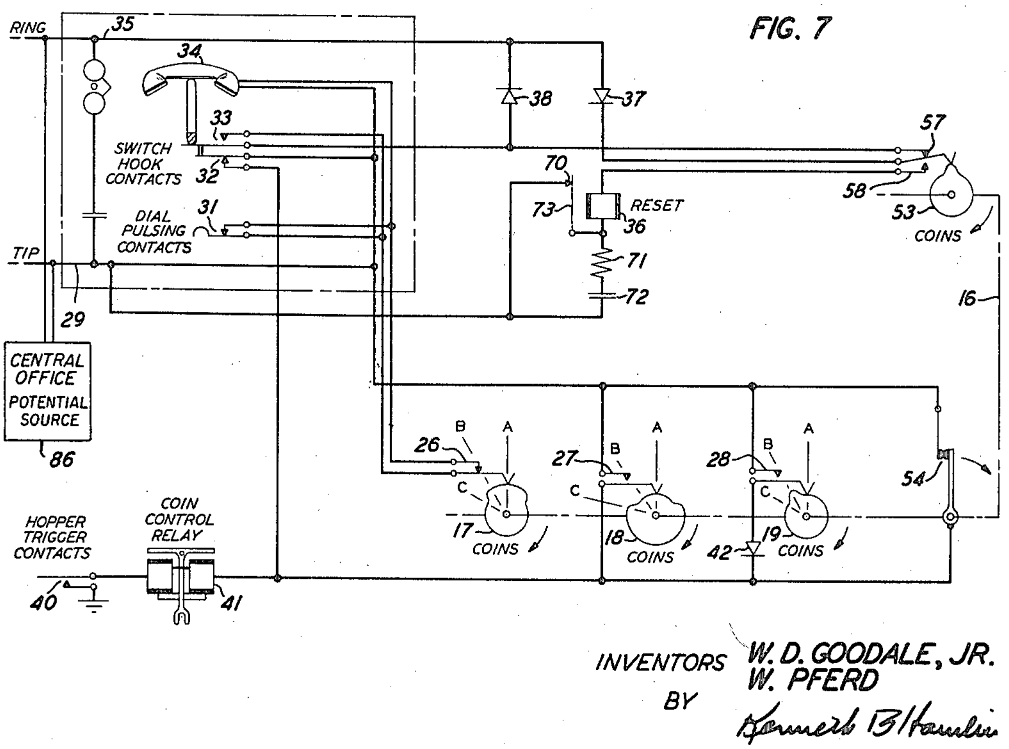
FIG. 7 shows a circuit schematic of a telephone pay station employing an illustrative embodiment of the invention wherein the central office is apprised of the amount deposited by applying a potential condition to the line a plurality of times, the number of which is representative of the total deposit.

The combination of the structures shown in FIGS. 1 and 4 provides the required control mechanism for the illustrative embodiments of the invention shown in FIGS. 7 and 9. FIG. 4 contains a reset device identical to that shown in FIG. 3 and described above, and in addition, a special control cam 53 with associated contacts 57 and 58 for the control of multi-unit signaling, and a member 81 affixed to an arm 80 with a pair of associated contacts 54 which open as soon as a coin is deposited.

In the same manner as described for the above three cams, control cam 53 is mounted upon totalizer shaft 16 and secured by a set screw 56 through shoulder 55; also, its contacting surface acts upon a spring pileup containing normally closed contact pair 57 and normally open contact pair 58. When a coin is deposited cam 53 rotates clockwise and contact pair 57 opens as contact pair 58 is closed. As will be discussed in detail later, this spring pileup is utilized in the deposit signaling circuit of several of the illustrative embodiments. Normally closed contacts 54 are utilized in several of the illustrative embodiments to complete the control circuit necessary to either collect or refund deposited coins after the coin totalizer has ben stepped back to a no-deposit position as part of the deposit apprisal operation on multi-unit calls. As shown in FIG. 4, in the no-deposit position arm 80 with member 81 maintains contacts 54 in a closed condition. Upon deposit of coins and the subsequent rotation of totalizer shaft 16, contacts 54 open.

FIG. 5 illustrates another reset mechanism and control device. This device, in conjunction with that of FIG. 1, provides the required control mechanism for the illustrative embodiment of the invention shown in FIG. 8. The reset mechanism shown in FIG. 5, as those previously discussed, permits two different ways of resetting the totalizer. Here, the device consists of a disc 59 containing one notch 63 mounted upon coin totalizer shaft 16, arm 49 and arm 60 mounted on and projecting from a hub 61 which is coaxial to shaft 16, retaining member 82 for positioning hub 61 against disc 59, member 62 containing detent 67 pivotally attached on the end of arm 60, spring 66 for maintaining arm 60 in a normal position, in which normal position member 62 is supported above the surface of disc 59 by rigidly mounted member 64, and magnet 65 which when energized draws arm 49 and hence arm 60 clockwise; in addition, member 79 projects perpendicularly from the side of disc 59 and is acted upon by member 52 which, as previously discussed, is the extension of the armature of a coin control relay.

Upon deposit of coins, disc 59 is rotated clockwise under the control of the coin totalizer. When it is desired to reset the totalizer to a no-deposit position, reset magnet 65 is energized drawing arm 49 clockwise. The hub 61 therefore causes arm 60 to also move clockwise until projection 67 on member 62 is beyond the point to which notch 63 has been rotated. Deenergization of magnet 65 releases arm 49 and spring 66 acting upon arm 60 returns the arms to a normal position. As arm 60 returns, projection 67 engages notch 63 and draws disc 59, hence the entire totalizer mechanism, back to the no-deposit position. Upon approaching position A, rigid member 64 engages the leading edge of member 62 lifting it and causing projection 67 to release notch 63. The totalizer is, therefore, again ready to operate when coins are deposited. Another manner of resetting the totalizer is provided by member 52. As previously mentioned, this member is an extension of a coin control relay armature and in FIG. 5 it is arranged and oriented so that operation of the coin control relay to either refund or collect the deposit will cause movement of member 52 towards the right as viewed in FIG. 5. Member 52 therefore bears against member 79 forcing disc 59 and hence the entire totalizer to rotate in the counterclockwise or reset direction. Any suitable means may be employed to limit the reset action so that the totalizer is reset exactly to the "no-deposit" position.

In addition to the reset device, FIG. 5 also illustrates a switch, the contacting arm 68 of which is mounted upon the totalizer shaft 16, and is electrically insulated from it. Rigidly supported by a suitable arrangement, a plurality of contact points 85 are arranged radially about the totalizer shaft at intervals equivalent to the arc traversed by the arm upon each five-cent deposit. A different contact is made, therefore, as each five-cent coin is deposited. Wiper 69 makes electrical connection with the arm and provides a stationary terminal for connecting the contacting arm into the circuit. This switch is utilized in the circuit shown in FIG. 8 to aid in supplying a different frequency signal to the office for each total deposit. Normally closed contact 54 is also a part of this structure and performs the same function as it does in FIG. 4 where it provides a circuit for operating the coin relay after the coin totalizer has been reset to "no-deposit" during multi-unit deposit apprisal.

Before commencing with a description of the illustrative embodiments of this invention, one more structural feature is worthy of note. Located at the bottom of the coin chutes and an integral part of many well-known coin relays is a hopper trigger. This trigger is merely a finger projecting into the coin chute which is deflected or tripped when the first coin is deposited. When deflected, the hopper trigger closes a pair of contacts which appear in the illustrative embodiment schematics as contacts 40. These contacts remain closed until the coin relay is operated to either refund or collect the deposit, at which time the hopper trigger is reset and they immediately reopen.

The four illustrative embodiments of this invention, herein disclosed, provide four different means of deposit apprisal. In the first, shown in FIG. 6, the central office determines the amount of deposit by sending reset pulses to the pay station thereby resetting the totalizing mechanism a given amount. The amount of reset is determined by the deposit required for the service requested. The illustrative embodiment disclosed in FIG. 7 provides deposit information by applying a potential condition to the line a plurality of times, the number of which is representative of the total deposit. A deposit appraisal circuit including a positive D.C. voltage source located at the central office may be employed to establish this potential condition once for every five-cent increment of the total deposit. FIG. 8 discloses an illustrative embodiment having a circuit for transmitting deposit information in the form of a specific frequency for each total amount of deposit. The source of a plurality of frequencies is available at the pay station, each one of which is indicative of a given amount of deposit and when the central office places a positive D.C. voltage on the ring conductor, the frequency representative of the total amount then deposited will be transmitted to the central office. In the illustrative embodiment disclosed in FIG. 9, the deposit information is in the form of tone pulses each of which is individually representative of a five-cent increment of the total deposit. A plurality of pulses is transmitted to the central office when a positive D.C. voltage is placed on the ring conductor by the central office.

Considering FIG. 6 specifically, it will be noted that the circuit includes the three cams shown in FIG. 1. Cam 17 acts upon spring contact 26 which serves as a means of shorting out the dial pulsing contacts 31 until a predetermining minimum amount of deposit is made. Cam 18 acts upon spring contacts 27 and serves as an initial deposit control by closing contact 27 as soon as the initial deposit is made. Cam 19 acts upon spring contact 28 closing it when the amount necessary for continuing a local call into overtime is deposited. In the upper left portion of FIG. 6, the telephone set is illustrated, represented by a handset 34, switchhook contacts 32, 33 that operate upon removal of the handset, and dial pulsing contacts 31 which transmit information relating to the proposed destination of a call in the well-known manner. The manner in which reset electromagnet 36 operates upon the coin totalizer mechanism is shown in FIG. 3 and was described above. Rectifiers 37 and 38 provide a means of isolating the telephone circuitry from the deposit apprisal circuitry. Coin signal device 39 may be the well-known gongs and chimes, or any other suitable means of audibly transmitting information concerning the denomination of each coin deposited, including those to be discussed later. Hopper trigger contact 40 is of the type described above and closes upon deposit of the first coin, to be reopened only by operation of the coin relay 41. This coin relay may be any of the well-known types containing an armature and vane arrangement for coin disposal that operate to collect the deposit when a positive voltage is applied and refund the deposit when a negative voltage is applied. Rectifier 42 is in the overtime charge check circuit and permits current to flow through this circuit between the tip conductor and ground only when the tip conductor is positive with respect to ground. Source of potential 86 is shown connected to ring and tip conductors 35 and 29. This source is located at the central office and may be applied in any well-known manner when required as disclosed hereinafter.

The three rotational positions indicated in FIG. 6, as well as in the other circuit schematics, are the same as those discussed above in connection with the coin totalizing structure. Here too, the deposit of coins is assumed to rotate the cams in a clockwise direction.

In order to properly consider the operation of the circuit shown in FIG. 6, let it be assumed that the initial rate charge is ten cents and that the charge for a local call is the same; also, that the additional deposit necessary to continue a local call into overtime is five cents. Deposit of a five-cent coin will, therefore, rotate the totalizer to position B and deposit of two five-cent coins or one ten-cent coin will rotate it to position C.

To initiate a call, the customer removes handset 34 from its cradle thereby opening switchhook contact 32 and closing switchhook contact 33. The initial charge is then deposited, rotating the control cams to position C. If two five-cent coins are used, the first will rotate the totalizer to position B, and as it proceeds down its chute, operate the hopper trigger closing hopper trigger contacts 40, and the second will rotate the totalizer to position C. In this position, cam 18 closes contact 27 and a path from the tip conductor 29 to ground is established through contacts 27, coin relay 41, and hopper trigger contact 40. In a manner well known to the art, a low negative D.C. voltage source at the central office utilizes this path to energize a line relay which in turn connects a dialing circuit to the loop indicated at the pay station by the presence of a dial tone. In position C, the dial pulsing contacts 31 are no longer shorted by contacts 26; therefore, the customer may dial the directory number of the party with whom he desires to make a connection.

If the call is abandoned before dialing, or before the called party answers, hang-up of the handset 34 causes switchhook contact 33 to open and then switchhook contact 32 to close. When switchhook contact 33 opens, the line loop composed of ring conductor 35, switchhook contact 33, rectifier 38, coin signaling device 39, dial pulsing contacts 31, handset 34, and tip conductor 29 is opened. This causes the release of the loop supervisory relay at the central office and, in the well-known manner, the central office applies a negative refund battery between the tip conductor and ground. This negative voltage, which is higher than that used by the central office during initiation of calls, energizes coin control relay 41 via a path which may be traced from tip conductor 29 through contact 27, and the hopper trigger contact 40 to ground, thereby refunding the deposit. As previously discussed, any operation of the coin control relay results in resetting the hopper trigger contacts to an open condition, and also due to the extension of the coin control relay armature member 52, shown in FIGS. 3, 4, and 5, such operation resets the totalizer to a no-deposit position. The telephone pay station is now ready to be reused and the customer who did not complete his call has had his money refunded.

Under usual circumstances, if the call is to a party within the local area, the connection to the called party will be made automatically and the desired conversation will ensue. Should the call be terminated within the time allotted for local calls, replacement of the handset and the subsequent opening of switchhook contact 33 will release the loop supervisory relay at the central office and in the well-known manner, the central office will apply a positive coin battery between the tip conductor and ground. This voltage will cause the operation of coin control relay 41 to collect the deposit and reset the totalizer to position A, and upon release, reset the hopper trigger contacts making the telephone pay station ready for reuse.

Not infrequently, the time provided for a local call is not deemed sufficient for the need of a customer and the call proceeds into overtime. For the purposes of this discussion, let it be assumed that the time allotted for local calls is four and one-half minutes. At the end of this period, the central office breaks the talking connection and positive coin battery is applied between tip conductor and ground, collecting the deposit, resetting the totalizer, and reopening hopper trigger contacts 40. Through experience, when a telephone pay station user hears the collection of the deposit as the coins drop into the collection box, he knows his calling time is up. In lieu of this knowledge, the small information bulletins posted in telephone booths will furnish information as to the procedure he should follow. Deposit of an additional amount will permit further conversation, and if this deposit is made, the call will continue uninterrupted. After five minutes has elapsed, the central office will apply a low positive D.C. voltage between the tip conductor and ground, and if a complete path is in existence the central office knows that the overtime deposit has been made. If the correct overtime deposit is present the control cams will be rotated to position B and a path from tip conductor to ground will exist which includes contact 28, rectifier 42, coin relay 41, and hopper trigger 40. At the conclusion of the overtime period this deposit will be collected and the same procedure will be followed. Thus, a local overtime call may proceed as long as the customer wishes to make the additional deposits and no operator intervention is required.

When a customer at a telephone pay station incorporating the embodiment of the invention shown in FIG. 6 wishes to make a multi-unit call, he will first ascertain the correct amount of deposit for a call to the area in question. If this is not known from past experience, a rate schedule may be consulted. Telephone pay stations which are known to handle a large number of multi-unit calls, such as those located at air and rail terminals, frequently post such rate schedules in a prominent place. Under normal conditions the entire cost of the call may be deposited immediately, the directory number of the called party dialed, and the call established without any operator contact with the customer. When the deposits are made the customer will hear the dial tone as soon as he has deposited an amount equivalent to the initial rate charge. This indicates that the dial is enabled and the central office has recognized the particular pay station as wishing to place a call. Although a circuit now exists through which a local call may be arranged, if the customer dials a directory number outside of the local range an operator will intervene and the increased time necessitated by human supervision of calls will result. Posted instructions indicate that the complete deposit should be made for multi-unit calls before dialing. When the correct deposit is made before the called party's directory number is dialed, an operator or automatic equipment at the central office will investigate the number and determine the amount of deposit necessary for the service requested. Naturally, the control cams have been rotated to some position beyond position C since the multi-unit total deposit is greater than the deposit required for a local call. After determining the correct amount of deposit due, the operator or the automatic central office equipment transmits totalizer reset pulses on the ring conductor to the pay station. These pulses are positive and are, therefore, passed by rectifier 37 while being blocked by rectifier 38 and thereby do not disturb the telephone circuitry. Each pulse energizes reset magnet 36 and steps the coin totalizer counterclockwise toward the no-deposit position as discussed above in connection with FIG. 3. The central office transmits the correct number of pulses to reset the totalizer to the initial deposit position, position C, and then makes a tip conductor to ground test with a low voltage D.C. source. If the totalizer is actually in position C, it indicates that the correct deposit was made and the call may go through. In position C, as already discussed, the tip conductor is grounded through contact 27 and this is a condition which the central office can detect. Had insufficient deposit been made, the reset pulses would have moved the totalizer back too far and contact 27 would be open. This would immediately inform the central office that insufficient deposit had been made. Apprised of this fact, an operator will then be called in to personally direct the customer as to the amount of deposit necessary. Collection and refund of deposits made on multi-unit calls using the illustrative embodiment of FIG. 6 is performed in exactly the same manner as for local calls.

In the event a call is to be made to a point beyond that encompassed by multi-unit equipment, provision is made for another means of deposit apprisal. When multi-unit equipment is not available, the operator must listen to the deposit of the coins, adding up each deposit until the correct total is reached to pay for the service desired. Satisfied of the amount of deposit the operator then, in the present day manner, establishes the connection. The presence of the well-known gongs and chimes is indicated by coin signaling device 39. Any means of informing the operator of the denomination of the coins deposited is suitable for this purpose, including those hereinafter disclosed and may be used in conjunction with this illustrative embodiment of the invention.

Turning now to the second illustrative embodiment of the present invention shown in FIG. 7, many features are seen to resemble those already discussed with respect to FIG. 6. The same method of controlling local initial and overtime charges is employed, as well as the same fraud prevention means. Since this is the case, the inition of calls and the operations and procedures related to local calls are all performed in the manner described above. In this circuit, however, an additional control cam is utilized to provide another method of informing the central office of the amount deposited for multi-unit calls.

The deposit apprisal control circuit in this embodiment, as in all of the illustrative embodiments, is isolated from the telephone circuitry by rectifiers 37 and 38 but consists of several elements in addition to the totalizer reset magnet. Among these elements are control cam 53 and its associated contacts which were discussed above in connection with FIG. 4, reset magnet 36 with related armature 73, and contacts 70. The same reset magnet 36 discussed in connection with FIG. 3 is used; however, in this embodiment a pair of contacts 70 are controlled by the magnet in addition to its function as a totalizer reset device. These contacts are bridged by a transient or surge suppression circuit shown in the schematic as resistor 71 and capacitor 72. The contacts, when closed, provide a D.C. path between the ring conductor 35 and the tip conductor 29 through which the reset magnet may be energized. Applying a positive D.C. voltage between the ring and tip conductor will energize the magnet, but as soon as it builds up sufficient magnetic strength, it will open contacts 70 by attracting armature 73 thereby disconnecting its own circuit. When the magnet no longer acts upon it, armature 73 returns to its normal position and the control circuit is again closed. This cycle will continue as long as there is a voltage across the loop and the coin totalizer will, therefore, be reset in discrete steps as previously discussed; hence, by applying a constant D.C. voltage across the reset magnet it will automatically step the totalizer in a counterclockwise direction. Upon reaching the no-deposit position the deposit apprisal circuit is permanently opened by the opening of contact 58.

A discussion of the typical procedure and operations involved in placing multi-unit calls from a telephone pay station incorporating the illustrative embodiment of the invention shown in FIG. 7 will clearly show how the central office is apprised of the deposit. The prospective customer will first deposit the correct amount of money to pay for his call. This deposit will rotate all of the control cams to some point beyond position C. Contact 27 is closed indicating a request for service, and in the well-known manner, the central office connects a dialing circuit to the line. Since contact 26 is open, the dial is enabled and the customer proceeds to dial the directory number of the party with whom it is wished to establish a connection. Upon receipt of the number, the central office determines what the deposit should be and then applies a low positive D.C. voltage to the ring conductor. At the pay station, this voltage back biases rectifier 38 and forward biases rectifier 37. Due to the position of control cam 53, contact 58 is closed and the positive voltage therefore finds a current path from ring to tip conductor through rectifier 37, contacts 58, reset magnet 36, armature 73, and contact 70. The ensuing current flow energizes reset magnet 36 which, in the manner previously described, resets the totalizer one step, or one five-cent increment and then opens contact 70. The discontinuity of the deposit apprisal control circuit caused by this contact opening may be interpreted at the central office as a proof that five cents have been deposited. Since the control circuit is open, the reset magnet 36 will be deenergized permitting the contacts 70 to reclose. This reestablishes the completed circuit and the totalizer is stepped back one more discrete step before the circuit is again opened by the movement of armature 73. This circuit opening is again noted by the central office as evidence of a deposit and, since it is the second consecutive circuit break, it is known that at least ten cents was deposited. Similar cycles will occur as long as the positive voltage is applied to the ring conductor or until the totalizer is reset to the no-deposit position, position A. In this position, cam 53 lifts the spring contact from contact 58 and connects it to contact 57, thereby stopping the stepping cycle. The coin totalizer is now set to the no-deposit position and a plurality of D.C. pulses comparable to the well-known dial pulses have been sent to the central office. The number of these pulses is indicative of the number of five-cent increments present in the total deposit. In a manner well known in the art, these pulses may be used to actuate an audible frequency tone generator at the central office yielding both a means of transmitting the information to tandem or toll offices or an intelligible signal for operator interpretation. If the information received agrees with the charge required by a call to the called party's area, the parties will be connected, otherwise, an operator would have to assist, and verbally instruct the customer concerning the correct deposit to be made.

Deposit refund and collection are performed in the same manner as previously discussed by applying either a negative or positive coin battery between the tip conductor and ground. A different circuit is needed to energize the coin relay upon termination of a multi-unit call, however, because the circuit used for deposit control following local calls does not exist since the totalizer and control cams are all at the no-deposit position and contacts 27 and 28 are open. Contact 54, which bridges the initial deposit control and local overtime deposit control contacts and is closed when totalizer is in the no-deposit position, provides a circuit. Following a multi-unit call, the path used to energize the coin relay is through contact 54, the coin relay 41, and hopper trigger contact 40.

The provision of the transient deposit signals that are necessary for the toll calls made to areas beyond those served by multi-unit equipment requires no additional elements when this illustrative embodiment is used. When a telephone pay station user wishes to call such an area, the well-known procedure of depositing the initial charge, dialing the operator or the directory number of the party called, informing the operator of the destination of the call, and then finally receiving instructions as to the necessary deposit will still be employed. From a customer's point of view, there is no need to change any of the operations involved in placing a toll call. However, using this illustrative embodiment, a more reliable form of deposit apprisal is available for the central office. After informing the customer of the necessary amount of deposit, the operator applies a positive D.C. voltage to the loop and, as each coin is deposited, the self-stepping reset magnet arrangement pulses out the deposit information as it continually seeks to reset the totalizing mechanism. Thus, this illustrative embodiment replaces the well-known gongs and chimes with a more effective signalling means.

To still further illustrate the advantages, scope, and potential of this invention, a third embodiment is shown in FIG. 8. This embodiment provides the same service for local initial and overtime control and fraud prevention as previously discussed, but deposit apprisal on multi-unit calls is performed somewhat differently. As seen in FIG. 8, the deposit apprisal circuit consists of reset magnet 65, an oscillator circuit 87, and a switching device 68. The reset magnet 65 and switching device 68 are discussed above in connection with FIG. 5, and the oscillator is of a standard transistor type employing a tank circuit with capacitance 83 and a plurality of inductances 84 for frequency tuning. As coins are deposited, switching arm 68 makes contact with a different point for each five-cent increment of the deposit, thereby varying the inductance in the tuning circuit and hence, the frequency of the oscillator. Application of a positive D.C. voltage between the ring and tip conductors will energize reset magnet 65 and enable the oscillator, producing a tone the frequency of which is determined by the amount of deposit which has been made. Capacitor 30 provides a low impedance path shunting the inductance of reset magnet 65 for more efficient application of the tone pulse to the line. As has been discussed, upon termination of this D.C. voltage the coil totalizer is automatically reset to the no-deposit position at which position the oscillator is disabled and the tone pulse ceases.

When using a telephone pay station containing the illustrative embodiment of the invention shown in FIG. 8 to make multi-unit calls, the operations of the customer are identical to those previously described. The correct amount of the deposit necessary for the call should be determined prior to the deposit by the customer. This deposit will then be made immediately and the control cams in the coin collector circuit will be rotated to some position beyond position C. The closing of contact 27 indicates to the central office in the well-known manner that that particular pay station is requesting service and the central office will connect a dialing circuit to the line. Since dial pulse contacts 31 are enabled, the directory number of the party to be called may then be dialed. The central office, upon receipt of this number, will interpret it and determine the charge necessary for the making of such a call. After such determination, a positive D.C. voltage will be applied to the loop energizing the transistor oscillator. A tone will, therefore, be transmitted to the central office the frequency of which is representative of the total deposit. If the correct deposit has been made, a connection with the called party will be established; otherwise, operator assistance will be necessary for personally instructing the customer concerning necessary deposit.

With this illustrative embodiment as with the others, deposit refund and collection are performed by applying either a negative or positive coin battery between the tip conductor and ground. Contacts 54 are again necessary to provide an energization circuit for the coil relay after a multi-unit call because all of the control cams are rotated to the no-deposit position during the deposit-apprisal phase of the call and, therefore, contacts 27 and 28 are opened.

The reset and switching combination that exists in the illustrative embodiment of FIG. 8 may also be used for transient deposit signaling in cases where multi-unit equipment is not available. In such a case, the customer will first make the initial deposit and then either dial the operator or dial the directory number of the party he wishes to call. The central office will then inform him of the deposit required for such a call and immediately apply a positive potential between the ring and tip conductors. As coins are deposited, tone signals are transmitted whose frequency represents the denomination of each coin deposited. Upon receipt and interpretation of each such signal, the central office momentarily disconnects the D.C. source from the loop thus permitting the totalizer to reset to the no-deposit position. The potential is then immediately re-applied in order to determine the denomination of the next coin deposited and this cycle continues until the total deposit has been made. The actual interpretation of the received signals may be done either by automatic equipment or by an operator. The audible frequencies indicative of a five, ten, or twenty-five cent deposit will be clearly differentiated, and easily understood by an operator. After the central office has ascertained that the correct deposit has been made, the call may be established.

Although the embodiment shown in FIG. 8 is concerned with one oscillator whose frequency is varied by the deposit of coins, there is no attempt to limit the invention to such a frequency arrangement. Any means of transmitting different frequencies for a given increment of deposit would be acceptable. For instance, the described switching device might be used to connect any one of a plurality of frequency sources to the line for each increment of deposit.

The illustrative embodiment of the invention depicted in FIG. 9 provides a plurality of tone pulses for deposit apprisal. For operation in this circuit, the reset magnet 36 used in connection with previous embodiments and discussed with respect to its reset functions in connection with FIG. 3 is arranged to operate in self-stepping fashion when a voltage is applied across its winding. By the addition of armature 76 and contacts 77 and 78, the winding of the magnet is shorted after it has built up sufficient magnetic strength to attract armature 76 for it then makes contact with contact 77. Naturally, this results in the deenergization of magnet 36 and consequently, the release of armature 76. Upon release, the armature returns to its normal position in contact with contact 78 and, therefore, the energization circuit has again closed. In the well-known fashion, this cycle of operation will continue until there is no longer an applied voltage. Resistor 75, as shown in FIG. 9, is connected to reset magnet 36 and provides a circuit between ring conductor 35 and tip conductor 27 when reset magnet 36 is shorted. Resistor 75 provides the voltage necessary to energize tone oscillator 74 and thereby place a tone on the line during the shorted phase of the reset magnet's stepping cycle. This oscillator may be of the transistor type and is energized by the same D.C. voltage which operates the reset magnet. Whenever a deposit is made, contact 58 will be closed and a circuit between the ring and tip conductor will exist through rectifier 37 which will permit a positive D.C. voltage applied to the loop to operate the deposit apprisal circuit. During the period the magnetic winding is shorted, the oscillator transmits a tone which terminates upon return of armature 76 to contact 78, thereby shorting the oscillator circuit. Hence, an audible tone pulse is transmitted for each step of the magnet and, as previously mentioned, each step resets the totalizer an amount equivalent to a five-cent increment of deposit. The number of tone pulses transmitted is, therefore, indicative of the number of five-cent increments in the total deposit. An audible frequency is used and the interval between the pulses is chosen to provide an easily-understood pulse train for interpretation either by an operator or by automatic equipment.

A telephone pay station incorporating this embodiment of the invention utilizes exactly the same circuit for the initiation of calls and for the provision of initial and overtime deposit investigation as those already considered. For this reason, it is only necessary to consider the operation of the deposit apprisal circuit in relation to multi-unit and toll calls. As with the other embodiments, the customer deposits the total amount before dialing and thereby causes all control cams to rotate to some position beyond position C. The directory number is then dialed by the customer and interpreted by the central office. A low positive D.C. voltage is then applied between the ring and tip conductors energizing the reset magnet 36. As discussed in the previous paragraph, the reset magnet automatically steps the totalizer to the no-deposit position and tone pulses are transmitted with each step. As the totalizer reaches position A, contact 58 opens and the stepping stops. If the number of pulses received at the central office corresponds to the charge for the multi-unit call, the call is permitted to proceed. If an inadequate deposit is indicated, personal operator supervision is required.

This coin collector circuit requires the addition of contact 54 to provide a deposit refund and collect circuit following multi-unit calls because it too steps the totalizer all the way back to the no-deposit during deposit signaling.

The transmission of tone pulses for deposit apprisal on multi-unit calls utilized in this illustrative embodiment is also useful for the transmission of transient deposit signals when toll calls are initiated from the telephone pay station. In this case, the customer deposits the initial rate and dials either the operator or the desired directory number and informs the responding operator of his call's destination. The operator then requests the proper deposit and causes a low positive D.C. voltage to be applied to the loop. As soon as a coin moves the coin totalizer from its no-deposit position, closure of contact 58 permits the reset magnet 36 to begin automatically stepping. Due to the coin velocity, the totalizer is set by the coin before the first release of the magnet starts the backward movement. As the stepping action proceeds, a train of tone pulses is sent to the central office; one for a five-cent coin, two for a ten-cent coin, and five for a twenty-five cent coin. These are readily distinguished by an operator and also can be registered and totalized automatically by equipment well known to the art. Conversation between the operator and the customer between deposits is made possible through contact 57 which by-passes rectifier 38 when the coin totalizer is in position A.

The above-detailed description is merely an illustration of four embodiments of the invention and it is not intended to limit the invention to these illustrative embodiments. Other arrangements may be devised by those skilled in the art without departing from the spirit and scope of this invention.

What is claimed is:

1. In a telephone pay station, a calling dial, normally closed contacts shunting said calling dial, totalizing means including a shaft rotatable in response to the deposit of coins for registering the amount of deposit, the degree of rotation of said shaft being proportional to the amount of deposit, rotatable means mounted on said shaft and adapted to rotate therewith, and control means actuated by said rotatable means at a predetermined degree of rotation for opening said normally closed contacts to enable said dial.

2. In a telephone pay station connected to a central office by a line conductor, a calling dial, totalizing means operable in response to the deposit of coins for registering the amount of deposit, a first settable means controlled by said totalizing means and settable for actuation at a predetermined amount of deposit, means controlled by said first settable means when actuated for establishing a current path from said line conductor to ground, a second settable means controlled by said totalizing means and settable for actuation at a predetermined amount of deposit, and means controlled by said second settable means when actuated for enabling said dial.

3. In a telephone pay station connected by a line to a central office, a calling dial, normally closed contacts shunting said dial, totalizing means including a shaft rotatable in response to the deposit of coins for registering the amount of deposit, the degree of rotation of said shaft being proportional to the amount of deposit, first rotatable means mounted on said shaft and adapted to rotate therewith, first control means actuated by said first rotatable means at a predetermined degree of rotation for opening said normally closed contacts to enable said dial, second rotatable means mounted on said shaft and arranged to rotate therewith, second control means actuated by said second rotatable means at a predetermined degree of rotation of said shaft, and means controlled by said second control means when actuated for applying a potential condition on said line to apprise said central office that a predetermined amount has been deposited.

4. In a telephone pay station connected by a line to a central office, totalizing means operable in response to the deposit of coins for registering the amount of deposit, settable means controlled by said totalizing means and settable for actuation at predetermined amounts of deposit, first means controlled by said settable means when actuated in response to a predetermined amount of deposit for applying a signal condition on said line, and second means controlled by said settable means when actuated in response to an additional predetermined amount of deposit for applying a signal condition on said line.

5. The combination of claim 4 in combination with means controlled by said settable means for resetting said totalizing means.

6. In a telephone pay station connected by a line to a central office, totalizing means operable in response to the deposit of coins for registering the amount of deposit, first settable means controlled by said totalizing means and settable for actuation at a predetermined amount of deposit, means controlled by said first settable means when actuated for applying a potential condition on said line to apprise said central office that said predetermined amount has been deposited, means responsive to a signal from said central office and controlled by said first settable means for resetting said totalizing means, second settable means controlled by said totalizing means and settable for actuation at a predetermined additional amount of deposit, means controlled by said second settable means when actuated for applying a potential condition on said line to apprise said central office that said predetermined additional amount has been deposited, and means responsive to a signal from said central office and controlled by said second settable means for resetting said totalizing means.

7. In a telephone pay station connected by a line to a central office, totalizing means including a shaft rotatable in response to the deposit of coins for registering the amount of deposit, the degree of rotation of said shaft being proportional to the amount of deposit, rotatable means mounted on said shaft and adapted to rotate therewith, control means actuated by said rotatable means at predetermined degrees of rotation of said shaft, means controlled by said control means when actuated at a predetermined degree of rotation of said shaft for applying a signal condition to said line to apprise said central office that a predetermined amount has been deposited, and further means controlled by said control means when actuated at a different predetermined degree of rotation of said shaft for applying a different signal condition to said line to apprise said central office that a different predetermined amount has been deposited.

8. The combination of claim 7 in combination with, means responsive to a signal condition on said line from said central office and controlled by said control means when actuated for resetting said totalizing means, and means for manually adjusting the position of said rotatable means on said shaft to determine the degrees of rotation of said shaft required to actuate said control means.

9. In a telephone pay station connected to a central office by a line conductor, a calling dial, totalizing means operable in response to the deposit of coins for registering the amount of deposit, first settable means controlled by said totalizing means and settable for actuation at a predetermined amount of deposit, means controlled by said first settable means when actuated for enabling said calling dial, second settable means controlled by said totalizing means and settable for actuation at a predetermined amount of deposit, means controlled by said second settable means when actuated for establishing a current path from said line conductor to ground, a third settable means controlled by said totalizing means and settable for actuation at a predetermined additional amount of deposit, and means controlled by said third settable means when actuated for establishing a unidirectional current path from said line conductor to ground.

10. In a telephone pay station connected by a line to a central office, a calling dial, normally closed contacts shunting said dial, totalizing means including a shaft rotatable in response to the deposit of coins for registering the amount of deposit, the degree of rotation of said shaft being proportional to the amount of deposit, first rotatable means mounted on said shaft and adapted to rotate therewith, control means actuated by said first rotatable means at a predetermined degree of rotation for opening said normally closed contacts to enable said dial, second rotatable means mounted on said shaft and arranged to rotate therewith, second control means actuated by said second rotatable means at a predetermined degree of rotation of said shaft, means controlled by said second control means when actuated for applying a potential condition on said line to apprise said central office that a predetermined amount has been deposited, coin disposal means operable in response to a signal condition on said line for collecting deposited coins and to a different signal condition for refunding deposited coins, and reset means responsive to a signal from said central office and controlled by said coin disposal means when operated for resetting said totalizing means.

11. In a telephone pay station connected to a central office by a line having two conductors, a calling dial, totalizing means including a shaft rotatable in response to the deposit of coins for registering the amount of deposit, the degree of rotation of said shaft being proportional to the amount of deposit, a first rotatable means mounted on said shaft and adapted to rotate therewith, a first control means actuated by said first rotatable means at a predetermined degree of rotation for enabling said dial, a second rotatable means mounted on said shaft and adapted to rotate therewith, a second control means actuated by said second rotatable means at a predetermined degree of rotation of said shaft, means controlled by said second control means when actuated for applying a potential condition on said line to apprise said central office that a predetermined amount has been deposited, a third rotatable means mounted on said shaft and adapted to rotated therewith, and third control means actuated by said third rotatable means at a predetermined additional degree of rotation of said shaft, means controlled by said third control means when actuated for applying a potential condition on said line to apprise said central office that a predetermined additional amount has been deposited, coin disposal means operable in response to a signal condition on one of said conductors for collecting deposited coins and to a different signal condition on said conductor for refunding deposited coins, means actuated by a signal on the other of said conductors, and reset means controlled by said last-mentioned means and said coin disposal means when operated for resetting said totalizing means.

12. A telephone pay station connected by a line to a central office, totalizing means operable in response to the deposit of coins for registering various amounts of said deposit, and automatic signaling means responsive to a potential condition on said line from said central office and controlled by said totalizing means for applying a signal condition on said line to said central office representing said various amounts of deposit, said signal condition having variations that are periodic only.

13. A telephone pay station connected by a line to a central office comprising control means, totalizing means operable in response to the deposit of coins for registering various amounts of deposit, automatic signaling means responsive to said central office control means for applying a signal condition on said line to said central office representing said various amounts of deposit, and other means operable thereafter for applying a signal condition on said line to said central office representing an additional amount of deposit.

14. A telephone pay station connected by a line to a central office, totalizing means operable in response to the deposit of coins for registering various amounts of said deposit, signaling means controlled by said totalizing means and automatically responsive to central office control for applying a signal condition on said line to said central office representing said various amounts of deposit, and other means operable thereafter and controlled by said totalizing means for applying a signal condition on said line to said central offce representing an additional amount of deposit.

15. A telephone pay station connected by a line to a central office, totalizing means operable in response to the deposit of coins for registering various amounts of deposit, signaling means responsive to a potential condition on said line from said central office and controlled by said totalizing means for applying a signal condition on said line to said central office representing said various amounts of deposit, reset means responsive to a potential condition on said line from said central office for resetting said totalizing means, and other means responsive to a potential condition on said line from said central office and controlled by said totalizing means for applying a signal condition on said line to said central office representing an additional amount of deposit.

16. The combination of claim 15 wherein said other means comprises a second reset means responsive to a potential condition on said line from said central office for resetting said totalizing means, and means controlled by said second reset means and said totalizing means for applying a signal condition on said line representing an additional amount of deposit.

17. A telephone pay station connected by a line to a central office, totalizing means operable in response to the deposit of coins for registering various amounts of deposit, signaling means controlled by said totalizing means for applying a first signal condition on said line to said central office representing said various amounts of deposit, central office controlled reset means for resetting said totalizing means during said first signal application, and means controlled by said reset means and said totalizing means subsequent to said first signal application for applying a signal condition on said line to said central office representing an additional amount of deposit.

18. A telephone pay station connected by a line to a central office, totalizing means operative in response to the deposit of coins for registering various amounts of deposit, signaling means responsive to a potential condition on said line from said central office and controlled by said totalizing means for applying a signal condition on said line to said central office representing said various amounts of deposit, reset means responsive to a potential condition on said line from said central office for resetting said totalizing means, and means controlled by said reset means and said totalizing means for applying a signal condition on said line to said central office representing an additional amount of deposit.

19. In a telephone pay station connected by a line to a central office, totalizing means operable in response to the deposit of coins for registering the amount of deposit, a tone source energized from said central office, and means connected to said tone source and controlled by said totalizing means for automatically transmitting tone pulses on said line, the number of said tone pulses being representative of said amount of deposit.

20. In a telephone pay station connected by a line to a central office, totalizing means operable in response to the deposit of coins for registering the amount of deposit, a tone source energized from said central office, reset means for resetting said totalizing means in response to central office control, and means connected to said tone source and controlled by said reset means and said totalizing means for transmitting tone pulses on said line, the number of said tone pulses being representative of said amount of deposit.

21. In a telephone pay station connected by a line to a central office, totalizing means operable in response to the deposit of coins for registering the total amount of deposit, stepping means responsive to a signal condition on said line from said central office for resetting said totalizing means in discrete steps, each of said steps representing a predetermined unit of said total deposit, and signaling means controlled by said stepping means for applying a tone pulse to said line for each said discrete step made by said totalizing means when reset.

22. The combination of claim 21 wherein said signaling means comprises a tone source, and means connected to said tone source energized from said central office and controlled by said stepping means for applying a tone pulse to said line for each said discrete step made by said totalizing means when reset.

23. In a telephone pay station connected by a line to a central office, totalizing means operable in response to the deposit of coins for registering the total amount of deposit, stepping means adapted to respond to a potential condition on said line from said central office for resetting said totalizing means in discrete steps, each of said discrete steps representing a predetermined unit of said total deposit, signal generating means adapted to respond to said potential condition on said line for generating an alternating-current signal, means controlled by said totalizing means for establishing an electrical circuit from said line through said stepping means and said signal generating means, and means connected to said signal generating means and controlled by said stepping means for applying an alternating-current signal pulse to said line for each said discrete step made by said totalizing means when reset.

24. The combination of claim 23 in combination with coin disposal means adapted to respond to a signal condition on said line for collecting deposited coins and to a different signal condition on said line for refunding deposited coins, and means controlled by said totalizing means for establishing an electrical path from said line through said coin disposal means.

25. The combination in accordance with claim 12 wherein said signaling means comprises a plurality of sources of signals enabled by said central office, each of said signals characterizing a different amount of deposit, selecting means controlled by said totalizing means for selecting the one of said signals which characterizes said total amount of deposit, and means for applying the selected one of said signals to said line.

26. The combination in accordance with claim 25 wherein said sources comprise alternating-current signals enabled by said central office, each of said signals having a distinctive frequency characterizing a different amount of deposit, means for transmitting the selected one of said signals over said line to said central office, and means for resetting said totalizing means.

27. The combination in accordance with claim 26 and further comprising means responsive to a potential condition on said line for generating said plurality of alternating-current signals, means controlled by said totalizing means for controlling said signaling means to generate the one of said alternating-current signals characterizing said total amount of deposit, means for applying said one of said alternating-current signals to said line, and means responsive to the removal of said potential condition from said line for resetting said totalizing means.

28. The combination of claim 27 in combination with coin disposal means adapted to respond to a signal condition on said line for collecting deposited coins and to a different signal condition on said line for refunding deposited coins, and means controlled by said totalizing means for establishing an electrical path from said line through said coin disposal means.

29. The combination in accordance with claim 12 wherein said signaling means comprises means responsive to a potential condition on said line and controlled by said totalizing means for successively applying a signal condition to said line to said central office, the number of applications of said signal condition to said line being representative of said various amounts of deposit.

30. The combination in accordance with claim 29 wherein said means responsive to a potential condition on said line comprises reset means for resetting said totalizing means, and means connected to said line and controlled by said reset means and said totalizing means for successively applying a potential condition to said line to said central office, the number of applications of said potential condition to said line being representative of said various amounts of deposit.

31. The combination in accordance with claim 30 wherein said reset means comprises stepping means responsive to a signal condition on said line from said central office for resetting said totalizing means in discrete steps, each of said steps representing a predetermined unit of said total deposit, and means controlled by said stepping means for applying a direct-current potential condition on said line for each said discrete step made by said totalizing means when reset.

32. The combination in accordance with claim 31 and further comprising contacting means controlled by said stepping means for creating an open condition of predetermined duration on said line for each discrete step made by said totalizing means when reset, and means controlled by said totalizing means for establishing an electrical circuit from said line through said stepping means and said contacting means.

33. The combination of claim 31 wherein said signaling means comprises contacting means controlled by said stepping means for creating an open condition of predetermined duration on said line to said central office for each said discrete step made by said totalizing means when reset.

34. The combination of claim 32 in combination with coin disposal means adapted to respond to a signal condition on said line for collecting deposited coins and to a different signal condition on said line for refunding deposited coins, and means controlled by said totalizing means for establishing an electrical path from said line through said coin disposal means.

35. The combination in accordance with claim 12 wherein said signaling means comprises reset means responsive to a plurality of discrete applications of direct-current potential condition on said line for resetting said totalizing means a corresponding plurality of discrete steps, each of said steps representing a predetermined unit of total said deposit, and means controlled by said totalizing means when reset to a predetermined position for applying a signal condition on said line.

36. The combination of claim 35 in combination with coin disposal means adapted to respond to a signal condition on said line for collecting deposited coins and to a different signal condition on said line for refunding deposited coins and means controlled by said totalizing means when reset to said predetermined position for establishing an electrical path from said line through said coin disposal means.

37. In a telephone pay station connected by a line to a central office, determining means operable in response to the deposit of a coin for determining the denomination of said coin, reset means controlled by said central office for automatically resetting said determining means following each said deposit, and signaling means energized from said central office controlled by said reset means and said determining means for applying a signal condition on said line representing said denomination.

38. In a telephone pay station connected by a line to a central office, determining means operable in response to the deposit of coins for determining the denominations of said coins, reset means responsive to a potential condition on said line and automatically operable after the deposit of each of said coins for resetting said determining means, and signaling means energized from said control office and controlled by said determining means and said reset means for applying a distinctive signal condition on said line characterizing the denomination of each of said coins deposited.

39. In a telephone pay station connected by a line to a central office, determining means operable in response to the deposit of a coin for determining the denomination of said coin, reset means for automatically resetting said determining means, a tone source energized from said central office, and means connected to said tone source and controlled by said determining means and said reset means for transmitting tone pulses on said line, the number of said tone pulses representing the denomination of said coin.

40. In a telephone pay station connected by a line to a central office, determining means operable in response to the deposit of coins for determining the denominations of said coins, reset means responsive to a potential condition on said line and operable after the deposit of each of said coins for resetting said determining means, a tone source, and means connected to said tone source and controlled by said reset means and said determining means for selectively transmitting tone pulses on said line, the number of said tone pulses representing the denomination of each of said coins deposited.

41. A telephone pay station connected by a line to a central office comprising in combination, a calling dial, totalizing means operable in response to the deposit of coins for registering the total amount of deposit, a first settable means controlled by said totalizing means and settable for actuation at a predetermined amount of deposit, means controlled by said first settable means when actuated for enabling said calling dial, second settable means controlled by said totalizing means and settable for actuation at a predetermined amount of deposit, means controlled by said second settable means when actuated for applying a signal condition on said line to apprise said central office that said predetermined amount has been deposited, third settable means controlled by said totalizing means and settable for actuation at a different predetermined amount of deposit, means controlled by said third settable means when actuated for applying a different signal condition on said line to apprise said central office that said different predetermined amount has been deposited, signaling means responsive to a potential condition on said line from said central office and controlled by said totalizing means for applying a signal condition on said line, coin disposal means operable in response to a potential condition on said line for collecting deposited coins and to a different potential condition for refunding deposited coins, and means controlled by said coin disposal means when operated for resetting said totalizing means.

42. The combination of claim 41 wherein said signaling means comprises, a tone source, reset means for resetting said totalizing means in discrete steps, and means connected to said tone source and controlled by said reset means and said totalizing means for transmitting tone pulses on said line, the number of said tone pulses being representative of said total amount of deposit.

43. The combination of claim 41 wherein said signaling means comprises, a plurality of sources of alternating-current signals, each of said signals having a distinctive frequency characterizing a different amount of deposit, selecting means controlled by said totalizing means for selecting the one of said signals characterizing said total amount of deposit, means for transmitting the selected one of said signals over said line to said central office, and reset means responsive to a signal condition on said line from said central office for resetting said totalizing means.

44. The combination of claim 41 wherein said signaling means comprises, a source of potential, reset means for resetting said totalizing means in discrete steps, and means connected to said source of potential and controlled by said reset means and said totalizing means for successively applying a direct-current potential condition to said line, the number of applications of said direct-current potential condition to said line being representative of said total amount of deposit.

45. The combination of claim 41 wherein said signaling means comprises, reset means responsive to a plurality of discrete applications of a direct-current potential condition on said line from said central office for resetting said totalizing means a corresponding plurality of discrete steps, each of said steps representing a predetermined unit of said total deposit, and means controlled by said totalizing means when reset to a predetermined position for applying a signal condition on said line.

46. In a telephone pay station connected by a line to a central office, totalizing means operable in response to the deposit of coins for registering the amount of deposit, a tone source, first reset means for resetting said totalizing means, means connected to said tone source and controlled by said reset and said totalizing means for transmitting tone pulses on said line, coin disposal means adapted to respond to signals on said line for collecting and refunding deposited coins, and second reset means for said totalizing means operative under the control of said coin disposal means.

47. The combination in accordance with claim 12 wherein said signaling means comprises a plurality of sources of signals enabled by said central office, each of said signals characterizing a different coin denomination, determining means operable in response to the deposit of a coin for determining the denomination of said coin, reset means for resetting said determining means, selecting means controlled by said determining means for selecting the one of said signals characterizing the denomination of said coin, and means controlled by said reset means for applying the selected one of said signals on said line.

48. The combination in accordance with claim 47 wherein said reset means further comprises means responsive to a potential condition on said line and operable after the deposit of each of said coins for resetting said determining means, said plurality of sources comprising means responsive to a potential condition on said line for generating a plurality of alternating-current signals, each of said signals having a distinctive frequency characterizing a different coin denomination, means operable upon the deposit of each of said coins and controlled by said determining means for controlling said signalling means to generate the one of said alternating-current signals characterizing the denomination of the deposited coin, and means controlled by said reset means for applying said one alternating-current signal on said line.

49. A telephone pay station connected by a line to a central office which includes control means, totalizing means operable in response to the deposit of coins for registering various amounts of deposit, and automatic signaling means responsive to said central office control means and said totalizing means for applying a signal condition on said line to said central office representing said various amounts of deposit.

References Cited in the file of this patent

UNITED STATES PATENTS

| | | |
|---|---|---|
| 2,000,804 | Wehren | May 7, 1935 |
| 2,204,083 | Hoyt | June 11, 1940 |
| 2,224,702 | Seidel | Dec. 10, 1940 |
| 2,306,654 | Triman | Dec. 29, 1942 |
| 2,345,167 | Willis | Mar. 28, 1944 |
| 2,684,998 | Fasser et al. | July 27, 1954 |
| 2,819,343 | Faulkner | July 7, 1958 |
| 2,974,199 | Bellamy | Mar. 7, 1961 |